United States Patent
Gaynor

(10) Patent No.: US 9,986,197 B2
(45) Date of Patent: May 29, 2018

(54) TRIP REPLAY EXPERIENCE

(71) Applicant: NAVICO HOLDING AS, Egersund (NO)

(72) Inventor: Phillip King Gaynor, Concord, NH (US)

(73) Assignee: NAVICO HOLDING AS, Egersund (NO)

( * ) Notice: Subject to any disclaimer, the term of this patent is extended or adjusted under 35 U.S.C. 154(b) by 16 days.

(21) Appl. No.: 15/245,618

(22) Filed: Aug. 24, 2016

(65) Prior Publication Data

US 2018/0063467 A1 Mar. 1, 2018

(51) Int. Cl.
| H04N 5/932 | (2006.01) |
| H04N 5/935 | (2006.01) |
| H04N 5/775 | (2006.01) |
| B63J 99/00 | (2009.01) |
| G11B 27/10 | (2006.01) |

(52) U.S. Cl.
CPC .............. *H04N 5/775* (2013.01); *B63J 99/00* (2013.01); *G11B 27/10* (2013.01); *B63J 2099/006* (2013.01)

(58) Field of Classification Search
CPC ................................. H04N 5/775; B63J 99/00
See application file for complete search history.

(56) References Cited

U.S. PATENT DOCUMENTS

| 3,752,431 | A | 8/1973 | McBride |
| 4,047,147 | A | 9/1977 | Wood et al. |
| 4,281,404 | A | 7/1981 | Morrow, Jr. et al. |
| 4,282,590 | A | 8/1981 | Wingate |
| 4,829,493 | A | 5/1989 | Bailey |
| 4,879,697 | A | 11/1989 | Lowrance et al. |
| 4,995,010 | A | 2/1991 | Knight |
| 5,253,220 | A | 10/1993 | Wilson, Sr. |
| 5,524,637 | A | 6/1996 | Erickson |
| 6,130,641 | A | 10/2000 | Kraeutner et al. |
| 6,222,449 | B1 | 4/2001 | Twining |

(Continued)

OTHER PUBLICATIONS

Abhimanyu Ghoshal; Google's latest iOS app creates beautiful motion GIFs from your Live Photos; downloaded Aug. 31, 2016; 3 pgs. http://thenextweb.com/google/2016/06/08/googles-latest-ios-app-creates-beautiful-motion-gifs-live-photos/#gref.

(Continued)

*Primary Examiner* — Hung Dang
*Assistant Examiner* — Girumsew Wendmagegn
(74) *Attorney, Agent, or Firm* — Nelson Mullins Riley & Scarborough LLP

(57) ABSTRACT

Whether for enjoyment, research, or other reasons, operators and occupants of marine vessels often want to re-live their experience. Embodiments of the present invention seek to utilize data captured during a trip to generate a trip replay experience that provides a re-creation experience for the viewer. In this regard, data from the systems and sensors of the marine vessel during the trip may be gathered and provided to a remote server. The data may be correlated as a function of time and intermingled to create a first-person type view from a "dashboard" to give the viewer a more realistic re-creation experience of the trip. Such a trip replay experience allows the operator, owner, or anyone else to relive a trip taken in the marine vessel.

20 Claims, 10 Drawing Sheets

(56) References Cited

U.S. PATENT DOCUMENTS

| | | |
|---|---|---|
| 6,595,315 B1 | 7/2003 | Fujimoto et al. |
| 6,628,569 B1 | 9/2003 | Steiner et al. |
| 7,161,872 B2 | 1/2007 | Kuriyama et al. |
| 7,224,642 B1 | 5/2007 | Tran |
| 7,236,426 B2 | 6/2007 | Turner et al. |
| 8,417,451 B2 | 4/2013 | Hersey et al. |
| 2004/0097802 A1 | 5/2004 | Cohen |
| 2004/0249860 A1 | 12/2004 | Stechschulte et al. |
| 2005/0162976 A1 | 7/2005 | Kuriyama et al. |
| 2005/0211812 A1 | 9/2005 | Nakagawa et al. |
| 2006/0018197 A1 | 1/2006 | Burczynski et al. |
| 2006/0050613 A1 | 3/2006 | Turner |
| 2006/0123050 A1 | 6/2006 | Carmichael |
| 2007/0025591 A1 | 2/2007 | Rhoads et al. |
| 2007/0223310 A1 | 9/2007 | Tran |
| 2008/0080317 A1 | 4/2008 | Inouchi et al. |
| 2010/0036880 A1 | 2/2010 | Carpenter |
| 2010/0141518 A1 | 6/2010 | Hersey et al. |
| 2012/0232719 A1 | 9/2012 | Salmon et al. |
| 2014/0032479 A1 | 1/2014 | Lauenstein et al. |
| 2014/0071167 A1 | 3/2014 | Lauenstein et al. |
| 2015/0054828 A1* | 2/2015 | Bailey .................. G08C 17/02 345/440 |
| 2015/0057929 A1* | 2/2015 | Bailey .................. G08C 17/02 701/526 |
| 2015/0206327 A1 | 7/2015 | Lauenstein et al. |

OTHER PUBLICATIONS

Jquery Image Zoom Plugin Examples; <www.elevateweb.co.uk/image-zoom/examples> retrieved on Jun. 23, 2016.

\* cited by examiner

TRIP REPLAY EXPERIENCE

FIELD OF THE INVENTION

Embodiments of the present invention relate generally to marine vessel data analysis and, more particularly, to systems, assemblies, and associated methods for generating a trip replay experience based on the marine vessel data.

BACKGROUND OF THE INVENTION

A marine vessel may have many systems and sensors that are configured to capture and monitor data associated with the operation and activities of the marine vessel and its occupants. Occupants of the marine vessel may want to re-live their trip and/or share what happened with others. Further, an owner or operator of the marine vessel may want to track what is happening during the trip. Accordingly, Applicant has developed embodiments of the present invention to re-create the experience of the trip for users.

BRIEF SUMMARY OF THE INVENTION

Depending on the configuration of the sensors or systems of the marine vessel, captured data may be transferred to a remote server for viewing. However, only a specific portion of the data occurring at a specific time may be viewed or the data is viewable independently of other data. For example, a user accessing the captured data may only view the speed of the vessel at a specific time without any correlation to other data captured at the same time. Accordingly, users are only able to access the captured data as independent data points.

In such a regard, embodiments of the present invention seek to correlate the captured data into a graphical user interface that provides a more all-round re-creation experience for the viewer. In this regard, embodiments of the present invention described herein may be configured to receive data from the systems and sensors of the marine vessel and correlate all the data received from a predetermined time period (e.g., during the trip). Accordingly, the user may access the captured data and view the data as a whole rather than viewing only independent data points. Further, embodiments of the present invention intermingle the captured data to create a first-person type view from a "dashboard" to give the viewer a more realistic re-creation experience of the trip. Thereby, embodiments of the present invention generate a trip replay experience that allows the operator, owner, or someone else (such as through social media) to relive a trip taken in the marine vessel.

In some embodiments, an apparatus may be provided. The apparatus may include a processor and memory including computer program code. The computer program code may be configured to, with the processor, cause the apparatus to receive trip data. The trip data may be generated from a plurality of sensors or systems associated with a marine vessel during a trip conducted by the marine vessel, where the trip defines a beginning and an end. Moreover, the computer program code may be further configured to, with the processor, cause the apparatus to generate a trip replay experience based on the trip data received from the plurality of sensors or systems during the trip conducted by the marine vessel. The trip replay experience may include a time-based illustration that shows a representation of the trip data as the trip data is gathered from the beginning of the trip to the end of the trip. Moreover, the trip replay experience may show a plurality of types of trip data including at least a location of the marine vessel as a function of time during the trip and one or more other types of trip data as a function of time during the trip. The trip replay experience may be formed into a representative first person view such that the plurality of types of trip data are presented intermingled on a single screen so as to provide the user with a re-creation experience of the trip. The computer program code may be further configured to, with the processor, cause the apparatus to cause display of the trip replay experience of the trip of the marine vessel on a screen.

In some embodiments, the beginning of the trip may be defined as receiving trip data that indicates ignition of an engine of the marine vessel is detected, and the end of the trip may be defined as receiving trip data that indicates deignition of the engine of the marine vessel is detected.

In some embodiments, the computer program code may be further configured to, with the processor, cause the apparatus to automatically generate the trip replay experience upon receipt of the trip data that indicates deignition of the engine of the marine vessel.

In some embodiments, the beginning of the trip may be defined as receiving trip data that indicates motion of the marine vessel for a first predetermined amount of time is detected, and the end of the trip may be defined as receiving trip data that indicates no motion of the marine vessel for a second predetermined amount of time is detected.

In some embodiments, the trip data generated from a plurality of sensors or systems located associated with the marine vessel may include at least one of sonar data, user mobile device data, radar data, chart data, environmental data, or watercraft data.

In some embodiments, the sonar data may be received from a sonar system in communication with a marine electronic device associated with the marine vessel, and the sonar system may be configured to gather sonar data from the underwater environment around the marine vessel.

In some embodiments, the user mobile device data may include at least one of picture data, video data, music data, or wearable device data.

In some embodiments, the trip data may be further generated from a source external to the marine vessel, and the computer program code may be further configured to, with the processor, cause the apparatus to generate the trip replay experience based at least on the trip data received from the plurality of sensors or systems associated with the marine vessel and the source external to the marine vessel during the trip conducted by the marine vessel.

In some embodiments, the trip data received from the source external to the marine vessel may include weather data.

In some embodiments, the computer program code may be further configured to, with the processor, cause the apparatus to cause display of the trip replay experience as a graphical user interface on the screen. The graphical user interface may include a plurality of parameters for user selection and at least one map region configured to display a map graphic based on the plurality of parameters selected by the user.

In some embodiments, the graphical user interface may further include at least one gauge region configured to display a gauge graphic that displays the one or more other types of trip data received by the apparatus, and the map region may be located on a first portion of the graphical user interface and the gauge region may be located on a second portion of the graphical user interface, where the second portion is at least partially imposed on the first portion.

In some embodiments, the graphical user interface may further include at least one picture region configured to display picture data comprised of one or more pictures received by the apparatus, and the picture region may be located on a third portion of the graphical user interface, where the third portion is at least partially imposed on the first portion.

In some embodiments, the graphical user interface may further include at least one scrolling timeline region configured to display a timeline of the trip from the beginning to the end, and the scrolling timeline region may be located on a fourth portion of the graphical user interface, where the fourth portion and the second portion are different.

In some other embodiments, a computer program product including a non-transitory computer readable medium that includes computer program code may be provided. The computer program code may be configured to, with the processor, cause the apparatus to receive trip data. The trip data may be generated from a plurality of sensors or systems associated with a marine vessel during a trip conducted by the marine vessel, where the trip defines a beginning and an end. Moreover, the computer program code may be further configured to, with the processor, cause the apparatus to generate a trip replay experience based on the trip data received from the plurality of sensors or systems during the trip conducted by the marine vessel. The trip replay experience may include a time-based illustration that shows a representation of the trip data as the trip data is gathered from the beginning of the trip to the end of the trip. Moreover, the trip replay experience may show a plurality of types of trip data including at least a location of the marine vessel as a function of time during the trip and one or more other types of trip data as a function of time during the trip. The trip replay experience may be formed into a representative first person view such that the plurality of types of trip data are presented intermingled on a single screen so as to provide the user with a re-creation experience of the trip. The computer program code may be further configured to, with the processor, cause the apparatus to cause display of the trip replay experience of the trip of the marine vessel on a screen.

In some other embodiments, a method is provided. The method includes causing the apparatus to receive trip data. The trip data may be generated from a plurality of sensors or systems associated with a marine vessel during a trip conducted by the marine vessel, where the trip defines a beginning and an end. Moreover, the method may include generating a trip replay experience based on the trip data received from the plurality of sensors or systems during the trip conducted by the marine vessel. The trip replay experience may include a time-based illustration that shows a representation of the trip data as the trip data is gathered from the beginning of the trip to the end of the trip. Moreover, the trip replay experience may show a plurality of types of trip data including at least a location of the marine vessel as a function of time during the trip and one or more other types of trip data as a function of time during the trip. The trip replay experience may be formed into a representative first person view such that the plurality of types of trip data are presented intermingled on a single screen so as to provide the user with a re-creation experience of the trip. The method may even further include causing display of the trip replay experience of the trip of the marine vessel on a screen.

BRIEF DESCRIPTION OF THE DRAWINGS

Figure 1:
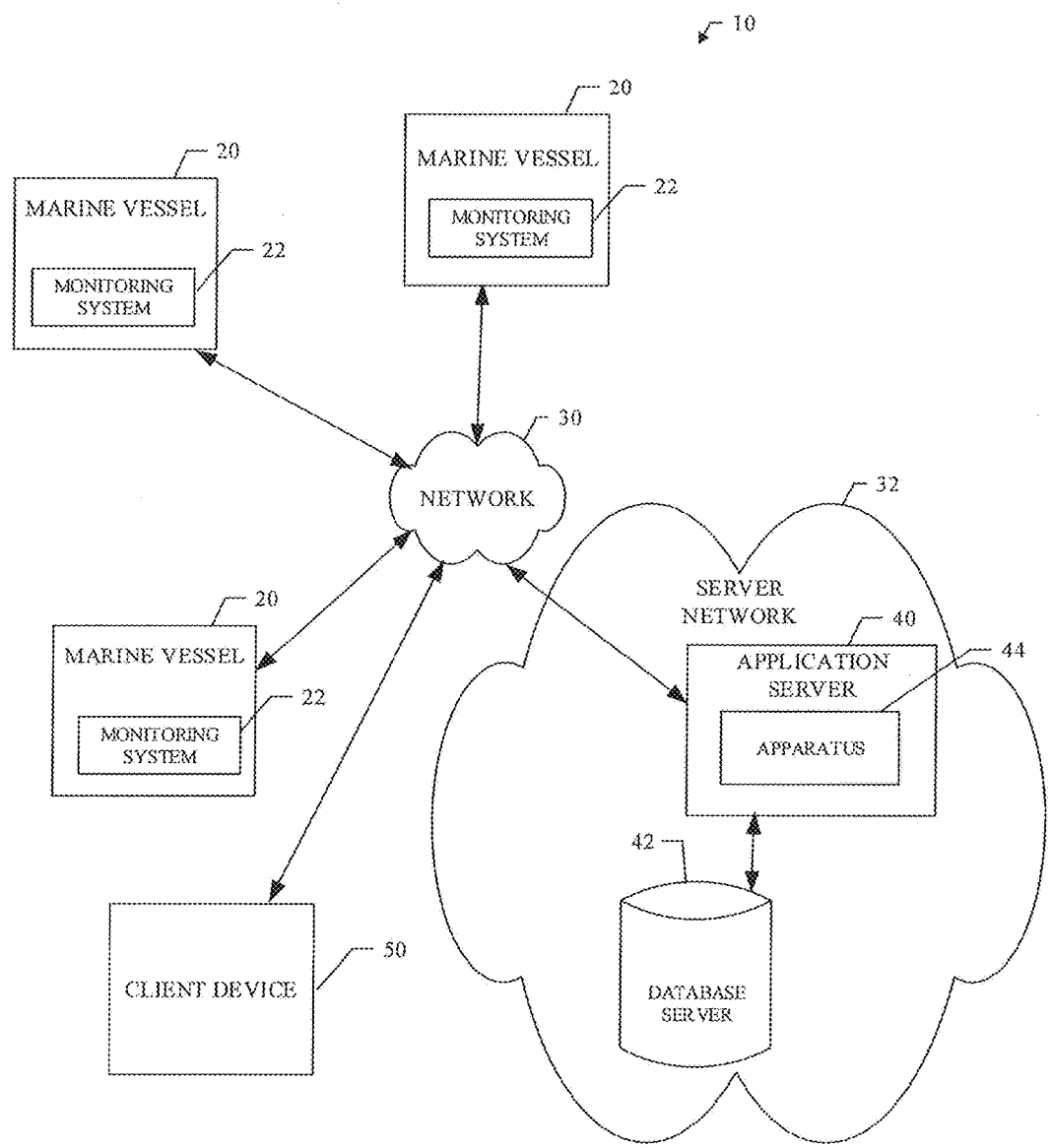
Figure 2:
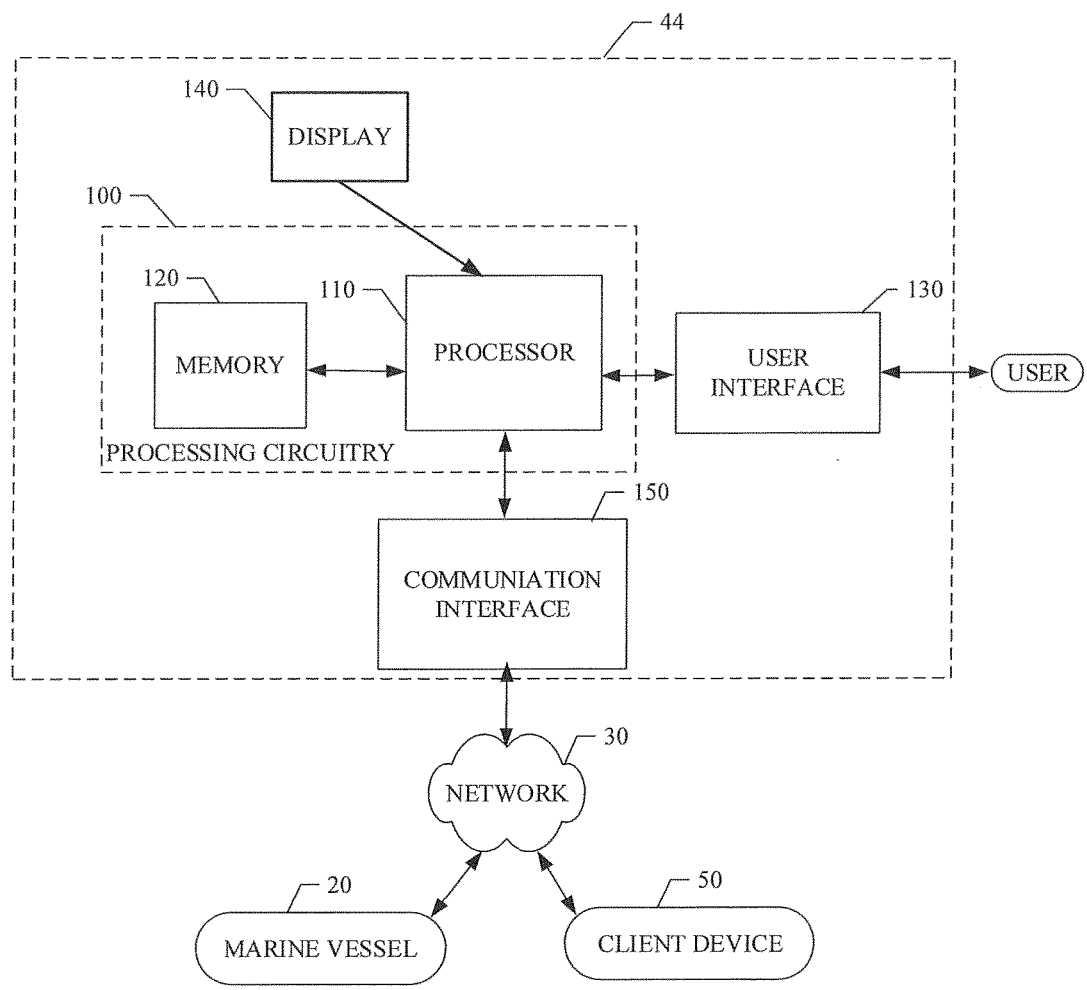
Figure 3:
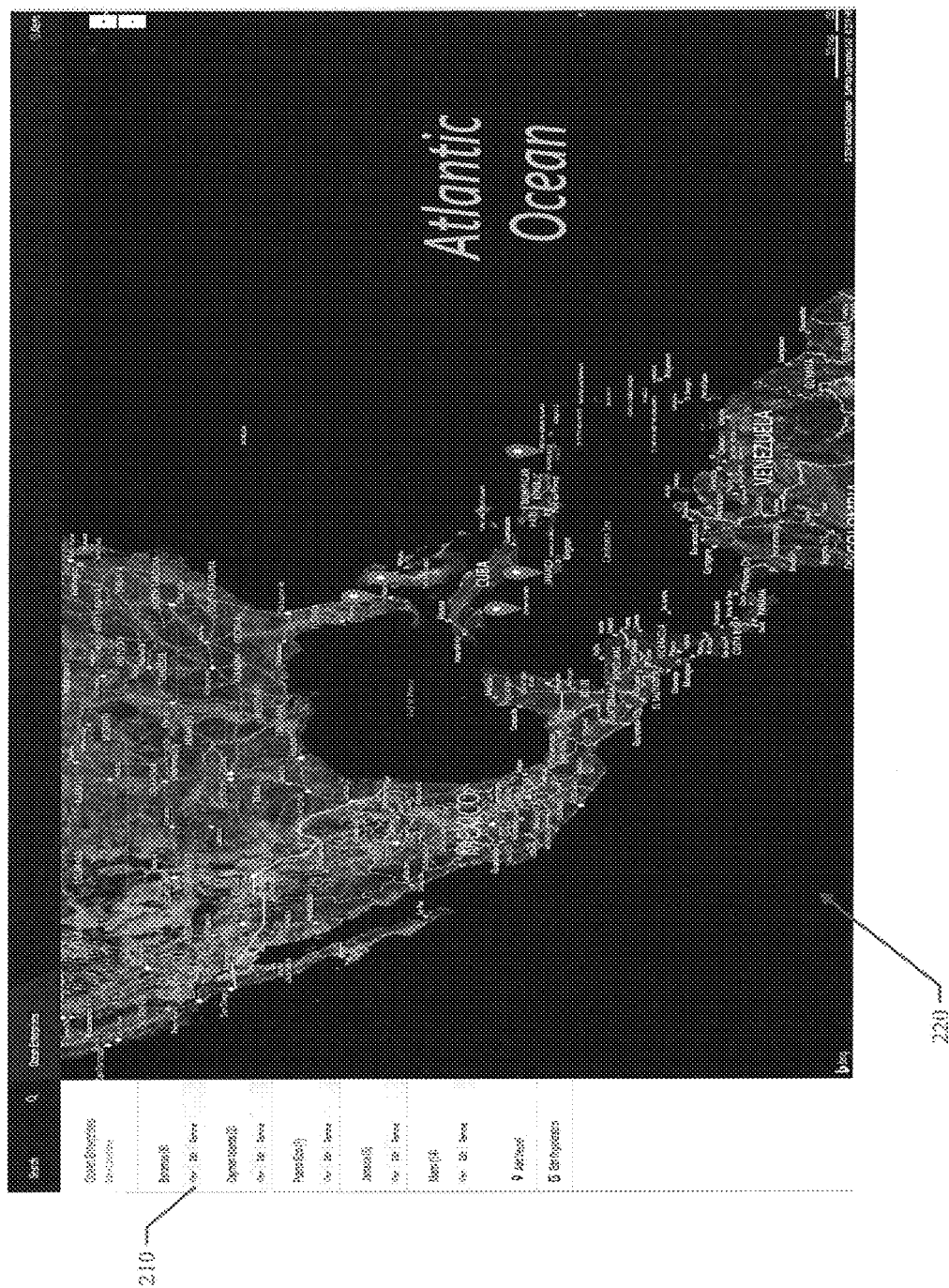
Figure 4:
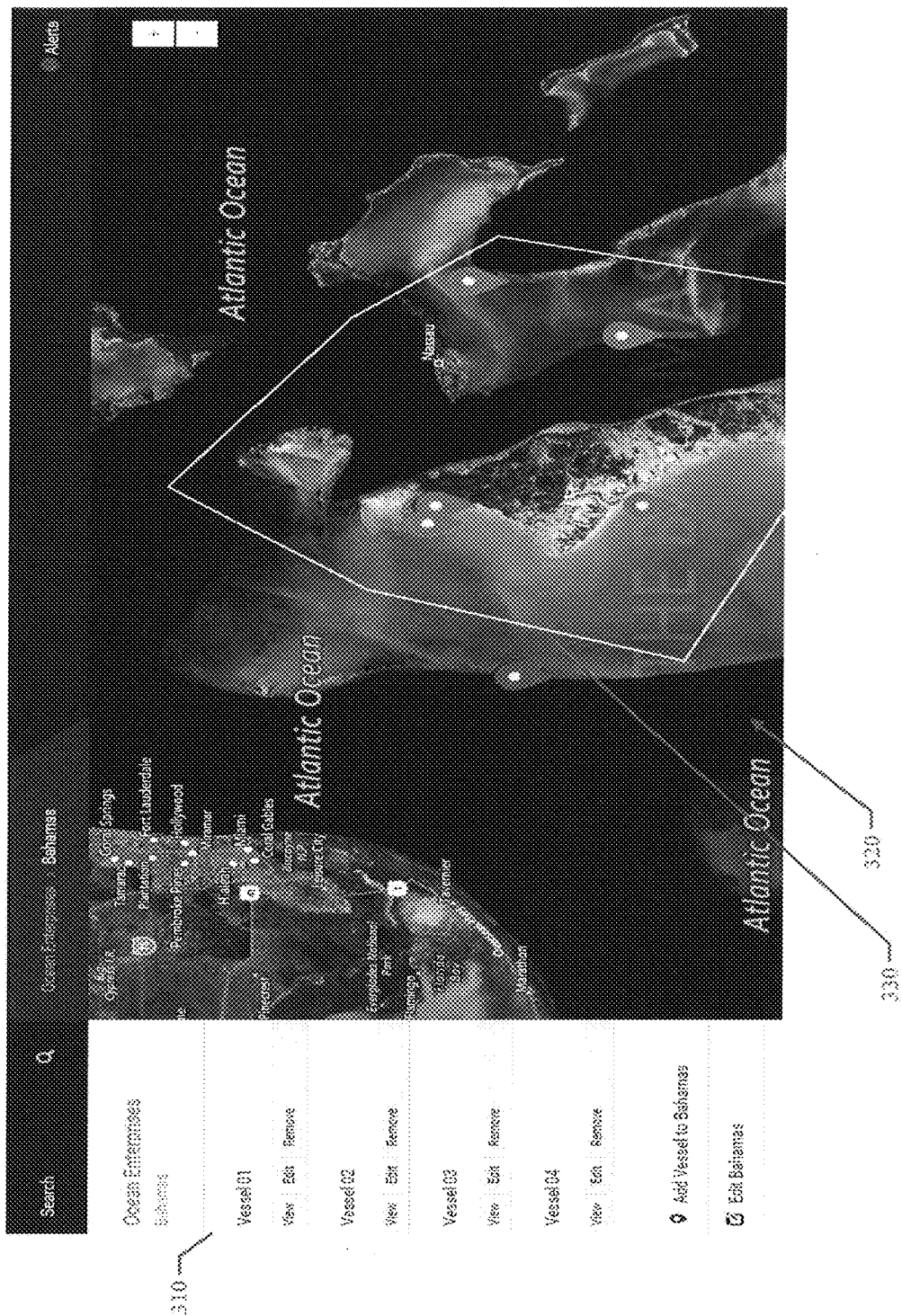
Figure 5:
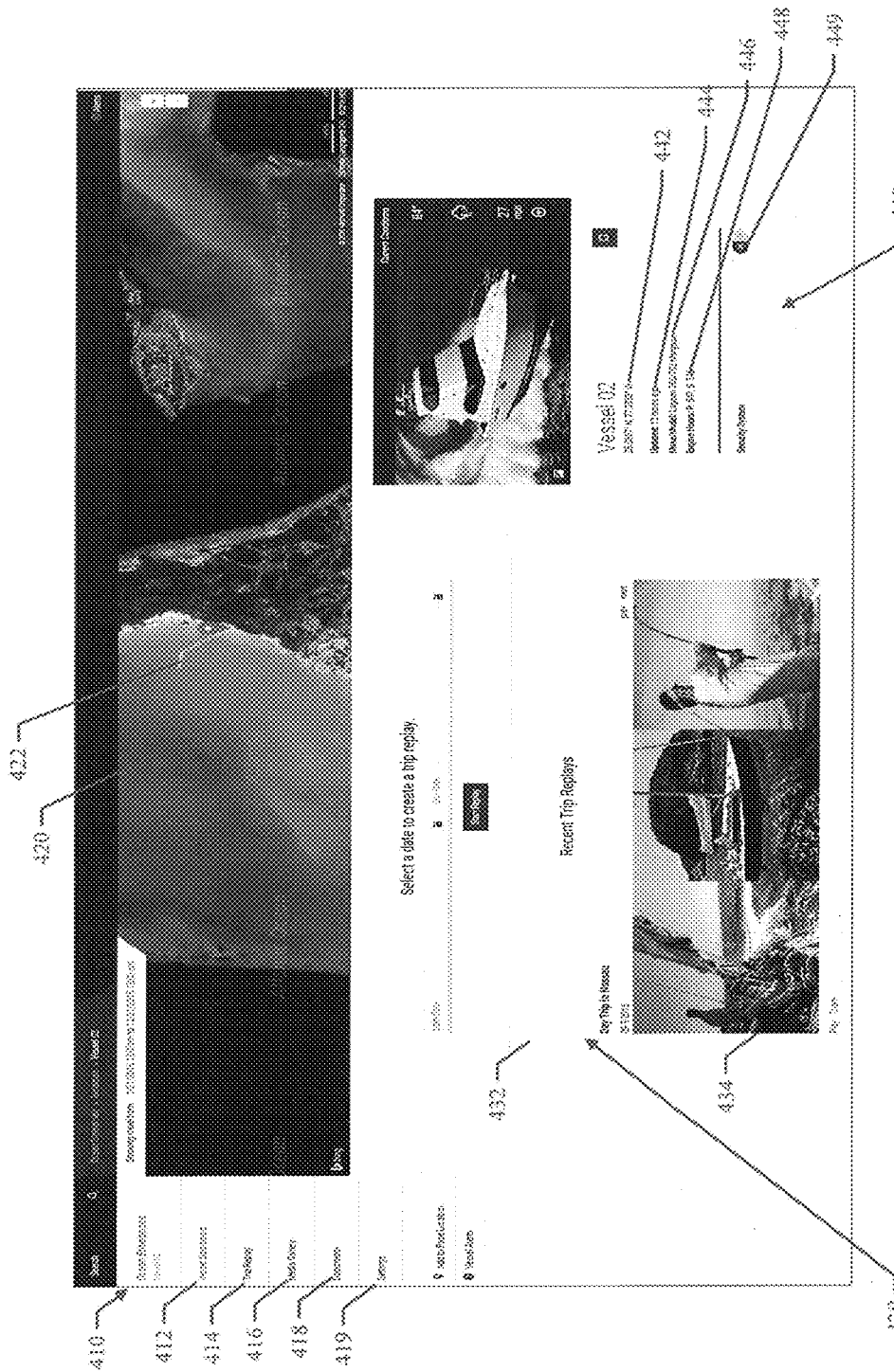
Figure 6:
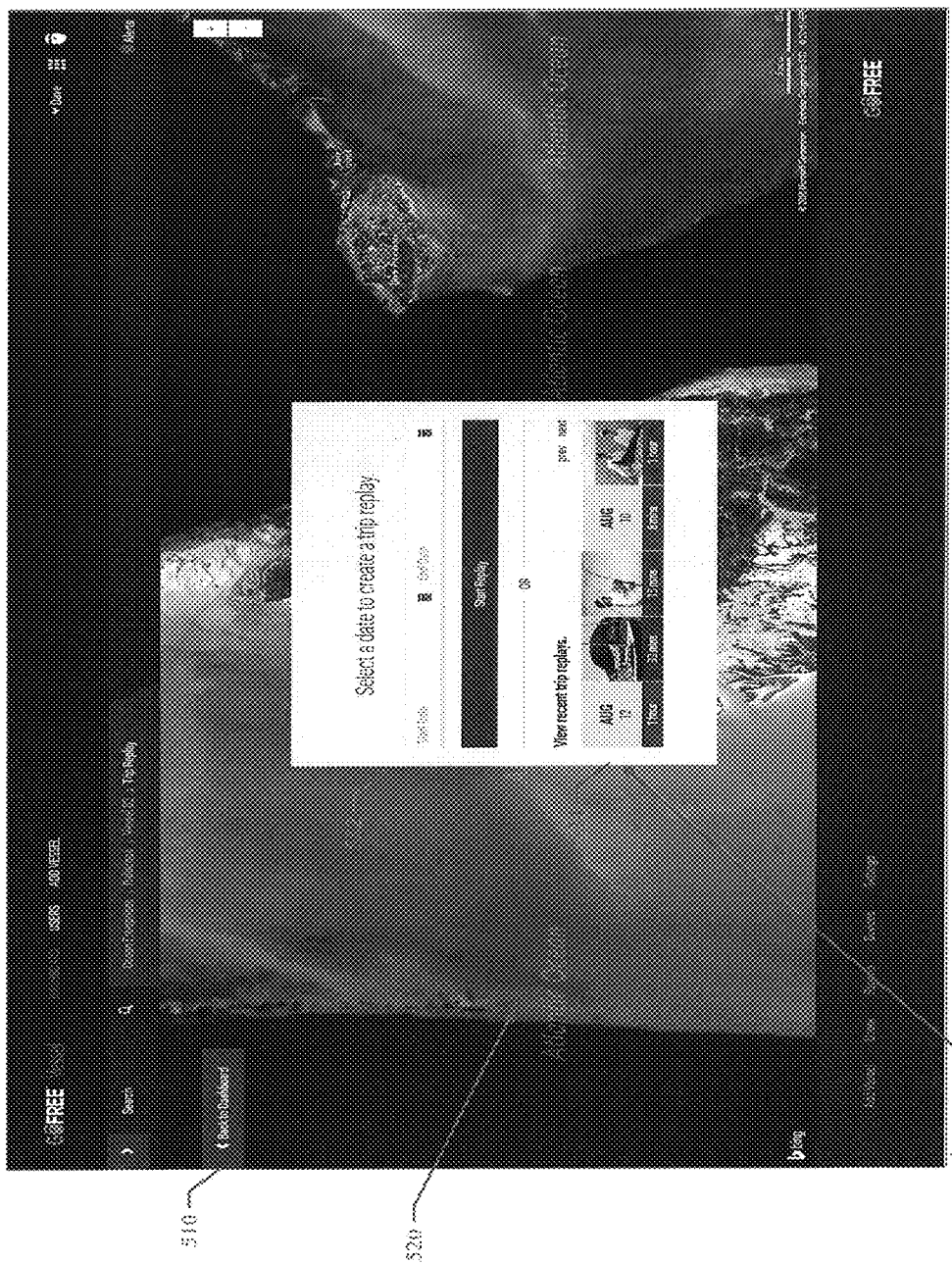
Figure 7:
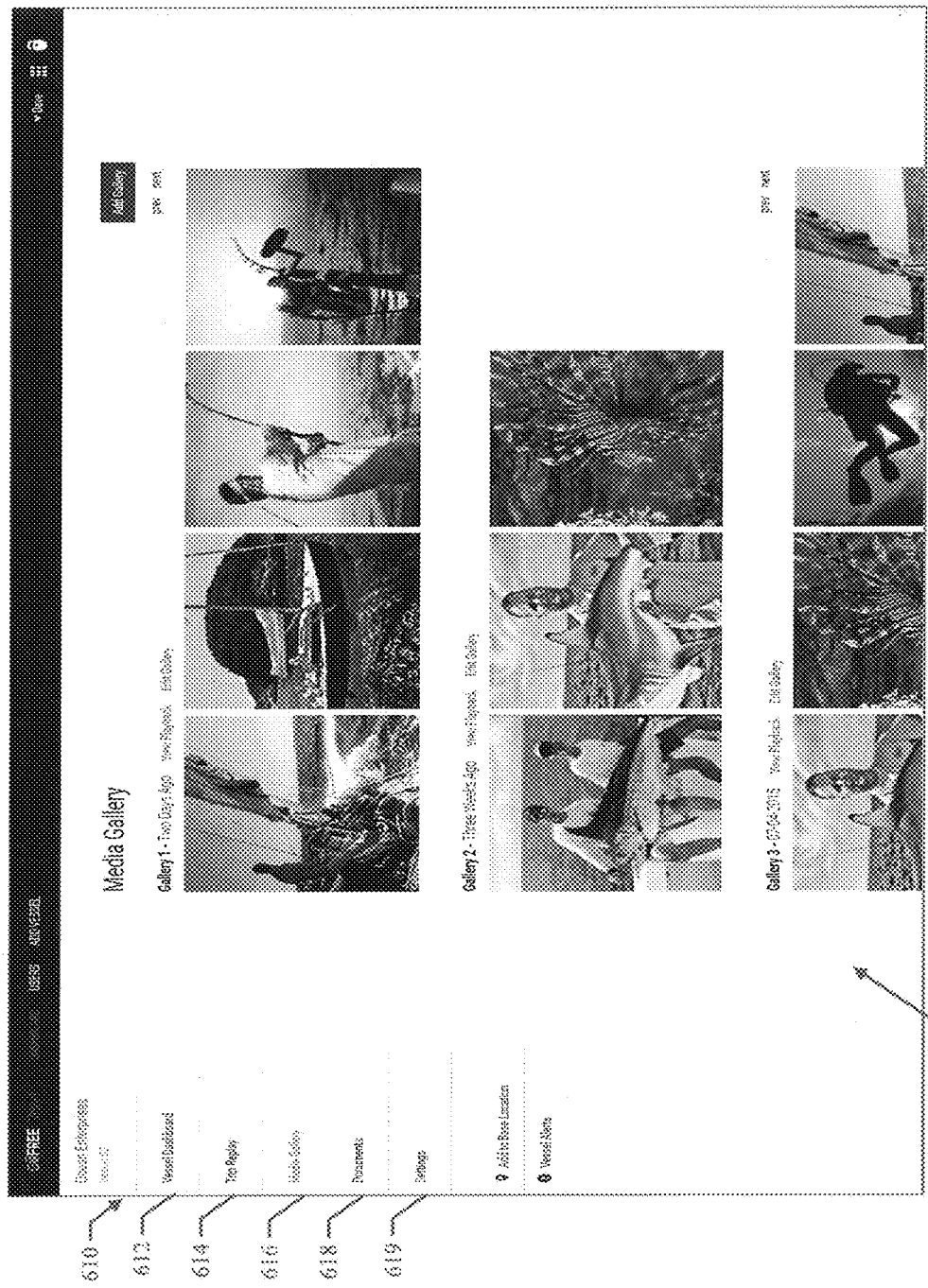
Figure 8:
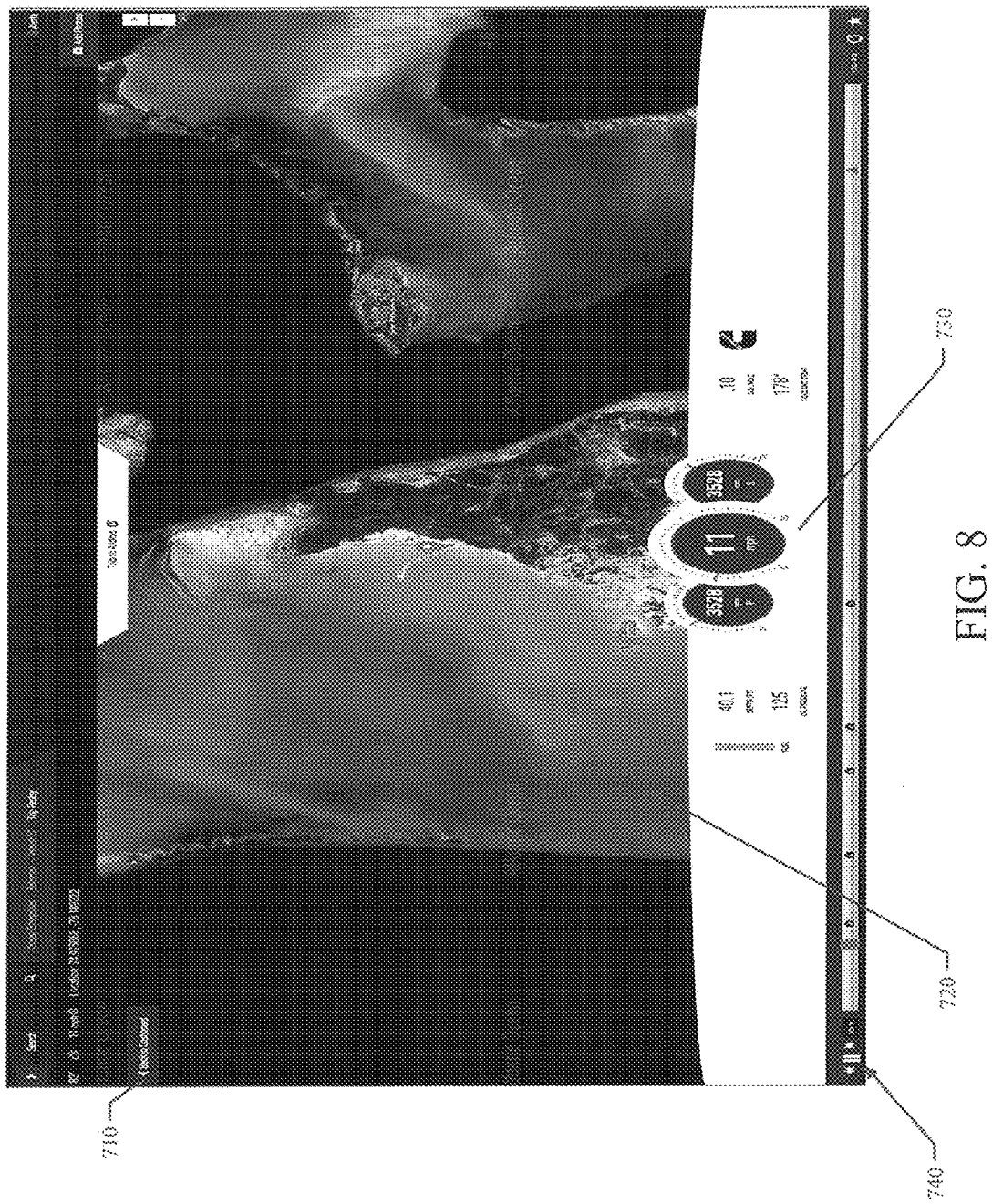
Figure 9:
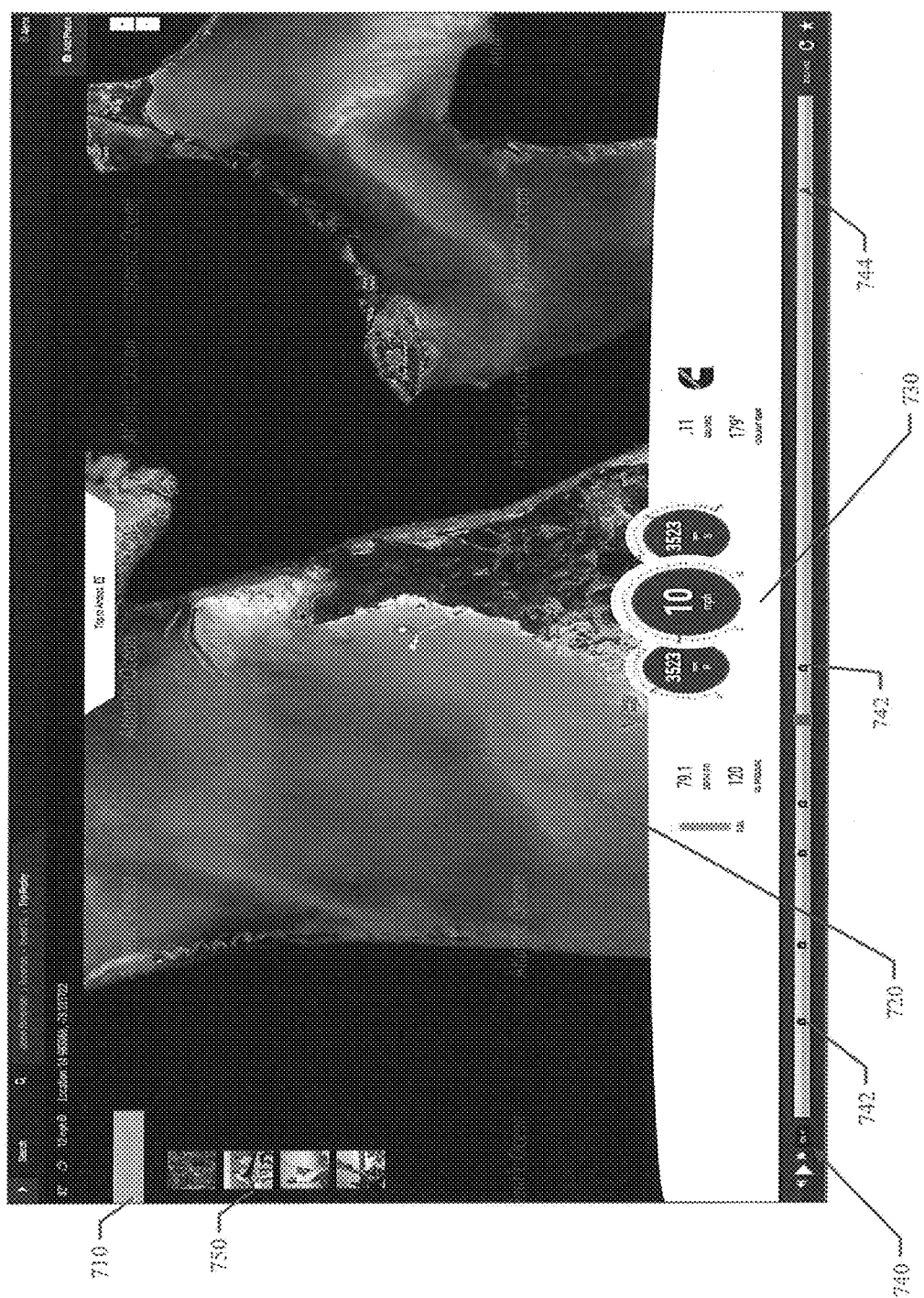
Figure 10:
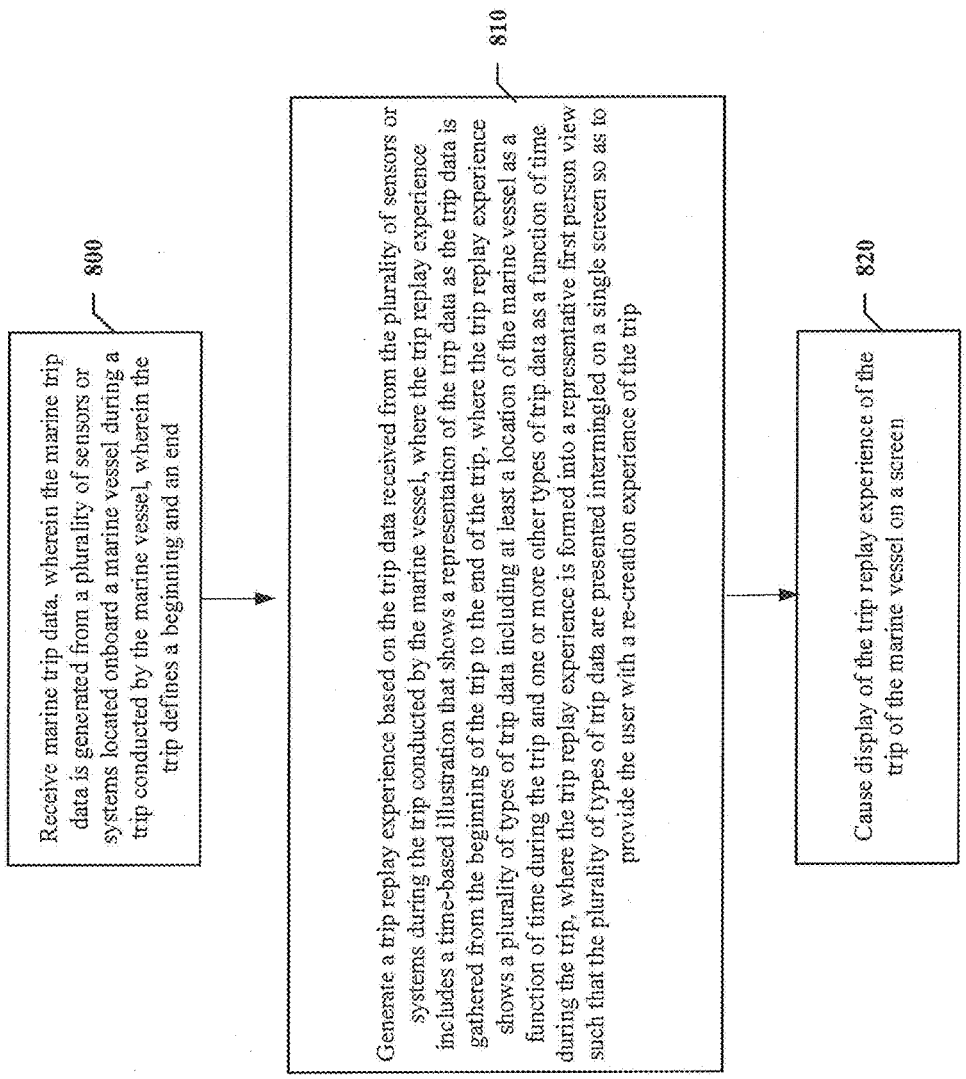

Having thus described the invention in general terms, reference will now be made to the accompanying drawings, which are not necessarily drawn to scale, and wherein:

FIG. 1 illustrates an example of a trip replay experience generation system in accordance with embodiments contained herein;

FIG. 2 illustrates an example of an apparatus in accordance with embodiments contained herein;

FIG. 3 illustrates an example user interface that shows available marine vessels and their various locations in accordance with embodiments contained herein;

FIG. 4 illustrates an example user interface that shows available marine vessels at a specific location as selected by the user in accordance with embodiments contained herein;

FIG. 5 illustrates an example user interface that shows information and options related to a specific marine vessel as selected by the user in accordance with embodiments contained herein;

FIG. 6 illustrates an example user interface that shows trip replay options available to the user in relation to a specific marine vessel in accordance with embodiments contained herein;

FIG. 7 illustrates an example user interface that shows available media for viewing by the user in relation to a specific marine vessel in accordance with embodiments contained herein;

FIG. 8 illustrates an example user interface that shows a representative first person view of a selected trip replay experience in relation to a specific marine vessel in accordance with embodiments contained herein;

FIG. 9 illustrates an example user interface that shows a representative first person view of a selected trip replay experience in relation to a specific marine vessel in accordance with embodiments contained herein; and FIG. 10 illustrates a flowchart of an example method of generating and displaying a trip replay experience according to embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

A marine vessel 20 (see FIG. 1) configured to traverse a marine environment may have various systems and sensors located onboard the marine vessel 20. These systems and sensors may be configured to monitor and capture data related to the operation and activities of the marine vessel 20. The captured data may be sent to an apparatus 44 (see FIG. 1) that is configured to receive and store the captured data for access by a user or client of the apparatus 44. Rather than the client or user of the apparatus 44 only being able to view each piece of data received individually or as independent data points, the apparatus 44 may be configured to receive the captured data and use the captured data to "re-create" an experience that the user or client had while operating or traveling on the marine vessel 20. This experience may be referred to herein as a trip of the marine vessel. The trip may be defined as a selected time period having a beginning and end.

Accordingly, in order to enable the generation of the trip replay experience, the systems and sensors located onboard the marine vessel 20 may be configured to start monitoring and capturing data at the beginning of the trip of the marine vessel 20 and to stop the monitoring at the end of the trip of the marine vessel 20.

The systems or sensors located onboard the marine vessel 20 may detect the beginning of the trip upon the occurrence of a beginning triggering event. The beginning triggering event may include, for example, the detection of an ignition of an engine of the marine vessel 20. In some cases, the beginning triggering event may be the detection of the ignition of the engine of the marine vessel 20 coupled with the detection of motion of the marine vessel 20 for a predetermined time away from the location designated as the base station or home of the marine vessel 20. In other cases, the beginning triggering event may only be the detection of motion of the marine vessel 20 for a predetermined amount or the ignition of an engine of the marine vessel 20.

Moreover, the systems or sensors located onboard the marine vessel 20 may detect the end of the trip upon the occurrence of an end triggering event. The end triggering event may include, for example, the detection of a deignition of an engine of the marine vessel 20. In some cases, the triggering event may be the deignition of the engine of the marine vessel 20 coupled with the detection of the marine vessel being stationary for a predetermined time at the location designated as the base station of the marine vessel. In other cases, the end triggering event may be the detection of no motion of the marine vessel for a predetermined amount or the deignition of an engine of the marine vessel 20.

Therefore, in accordance with example embodiments contained herein, the apparatus 44 may be configured to receive data from the trip of the marine vessel 20 and, based on the data received, generate a trip replay experience thereby allowing a user or client of the apparatus 44 to relive the trip taken in the marine vessel 20.

FIG. 1 illustrates an example system in which an apparatus 44 that is configured to generate a trip replay experience may be employed. As shown in FIG. 1, the system 10 according to an example embodiment may include one or more marine vessels 20 and one or more client devices 50. Notably, although FIG. 1 illustrates three marine vessels 20 and one client device 50, it should be appreciated that the number of marine vessels 20 and client devices 50 is in no way meant to be limiting to further example embodiments.

As shown in FIG. 1, the marine vessel 20 may have a marine monitoring device 22 that includes systems, sensors, and user devices located onboard the marine vessel 20. The marine monitoring device 22 (i.e., the systems, sensors, and user devices located onboard the marine vessel 20) may be configured to monitor and capture data related to the operation of the marine vessel 20 during the trip or activities related to the trip of the marine vessel 20, and then transfer the data to the apparatus 44. This data related to the operation and activities of the marine vessel 20 during the trip of the marine vessel 20 may be referred to herein as "trip data". Accordingly, the trip data monitored and captured by the marine monitoring device 22 may include at least one of sonar data, user mobile device data, radar data, chart data, environmental data, or watercraft data. It should be understood, however that, the respective systems, sensors, and user devices monitoring and capturing the sonar data, the user mobile device data, the radar data, the environmental data, the chart data, and the watercraft data may be configured to interface and communicate directly with the apparatus 44.

The marine monitoring device 22 of the marine vessel 20 may receive the trip data and location data of the marine vessel 20 from a marine electronic device located onboard the marine vessel 20. The marine electronic device may be a multi-function display (MFD) device, a fish finder device, a dedicated sonar module, smart phone, laptop computer, tablet computer, personal data assistant (PDA), and/or any other implementation known to those skilled in the art. Additionally or alternatively, as noted above, the trip data and/or location data may be gathered from sources external to the marine electronic device.

The marine monitoring device 22 may include or be associated with a position sensor, such as a global position system (GPS) sensor. The position sensor may be configured to determine a location of the marine monitoring device 22, and therefore, the associated marine vessel 20. The location may be defined as specific latitude or longitude coordinates, a body of water, a region of a body of water, or a specific point on a body of water. The marine monitoring device 22 may also be configured to associate location data indicative of the location with time data, such as by time stamping the location data, creating a cross reference, or storing the association in a common memory location.

The marine monitoring device 22 may be configured to gather sonar data. For example, the marine monitoring device 22 may include or be associated with one or more sonar transducers, and the sonar transducers may be in the form of one or more castable transducers, remote mounted transducers, and/or any other implementation of transducers known to those skilled in the art. The one or more sonar transducers may be configured to produce one or more sonar output signals, e.g. sonar beams or pulses, and emit the sonar output signals into the body of water. Properties of the sonar output signals generated by the transducer may be determined by an area and shape of the sonar transducer, the sound wave frequency of the sonar transducer, the sound velocity of the propagation medium (e.g. a body of water), or the like. Reflected sonar output signals may be received by the sonar transducer in the form of one or more sonar return signals. Sonar data may represent one or more sonar return signals that have reflected from a surface of an object in the body of water. In one implementation, an object may be a point on an underwater floor, a portion of a fish, a piece of debris, and/or any other waterborne object. In some example embodiments, the sonar data may correspond to an area of water proximate to the marine vessel 20, including areas to the side of, behind, below, and/or to the front of the marine vessel 20. Accordingly, the sonar data captured by the marine monitoring device 22 may be used to identify objects in the area of water, such as fish, logs, debris, structure, or the like, or identify features of the body of water, such as depth and bottom contours.

Alternatively or additionally, the marine monitoring device 22 may be configured to gather user mobile device data. Accordingly, the marine monitoring device 22 of the marine vessel 20 may include or be associated with at least one user mobile device located onboard the marine vessel 20. The user mobile device may include a smart phone, laptop computer, tablet computer, personal data assistant (PDA), a wearable device or article (such as an article of clothing, watch, fitness tracker, and/or the like), a camera, and/or any other implementation known to those skilled in the art. The user mobile device data, therefore, may include picture data, video data, music data, fitness data, health data, and/or the like related to activities occurring during the trip of the marine vessel 20 that was captured by the user mobile device located onboard the marine vessel 20. Accordingly, the user mobile data received by the marine monitoring device 22 from the user mobile device located onboard the marine vessel 20 during the trip of the marine vessel 20 may be used to identify music played during the trip, or videos or pictures captured of the trip, or the fitness or health of the user during the trip. The marine monitoring device 22 may also be configured to associate the user mobile data with time or location data, such as by time and location stamping the user mobile data, creating a cross reference, or storing the association in a common memory location.

Alternatively or additionally, the marine monitoring device 22 may be configured to gather radar data. Accordingly, the marine monitoring device 22 may include or be associated with a radar system. The radar system may be configured to determine the location of objects near the marine vessel 20 and, in some cases, form an image of the located object. The location of the object may be defined as specific latitude or longitude coordinates, a body of water, a region of a body of water, or a specific point on a body of water. The marine monitoring device 22 may also be configured to associate the radar data with time and location data, such as by time and location stamping the radar data, creating a cross reference, or storing the association in a common memory location.

Alternatively or additionally, the marine monitoring device 22 may be configured to gather or determine chart data. Accordingly, the marine monitoring device 22 may include or be associated with a navigation system for gathering or working with chart data. This navigation system may be configured to create a route of the marine vessel 20 in relation to a determined location and destination of the marine vessel 20. Accordingly, the marine monitoring device 22 may also be configured to associate the chart data with the location data and the time data, such as by time and location stamping the chart data, creating a cross reference, or storing the association in a common memory location.

Alternatively or additionally, the marine monitoring device 22 may be configured to gather environmental data. Accordingly, the marine monitoring device 22 may also include one or more condition parameter sensors configured to measure environmental data. The condition parameter sensors may include, for example, an air temperature, a water temperature, a current sensor, a wind sensor, a speed sensor, sea state sensor (e.g. an accelerometer), among many others. The marine monitoring device 22 may associate the environmental data indicative of the condition parameters from each of the condition parameter sensors with the time data and the location data, such as by time and location stamping the environmental data, cross referencing the association with the environmental data, or storing the association with the environmental data in a common memory location.

Alternatively or additionally, the marine monitoring device 22 may be configured to gather watercraft data. Accordingly, the marine monitoring device 22 may include or be associated with various watercraft sensors, such as an engine sensor, a battery sensor, a propulsion system sensor, a navigational system sensor, or a diagnostic system sensor. The watercraft sensors may be configured to determine the status and information associated with at least the engine, battery, propulsion system, navigational system, or the diagnostic system of the marine vessel 20. The marine electronic device 22 may also be configured to associate the watercraft data with the time and location data, such as by time and location stamping the watercraft data, creating a cross reference, or storing the association in a common memory location.

In some example embodiments, the marine monitoring device 22 may include or be associated with a user interface. In some example embodiments, the user interface may be a portion of or associated with a remote computing device, such as smart phone, laptop computer, tablet computer, or the like. The user interface may be utilized by a person using the marine monitoring device 22 such as to enter manual user input. Accordingly, the user may be able to enter data of activities or events associated with the trip of the marine vessel 20. For example, the user may input data indicative of a number of fish caught. The number of fish caught may be associated with a particular location and/or particular time (e.g., entered on a per catch basis) or a region of the body of water and/or a time period (e.g., entered on a per fishing area basis). The user input may also include the type of fish caught, the size of the fish caught, the bait used to catch the fish, number of lines or nets, number of active fishermen, or the like. Additionally, the user input may include environmental observations, such as sea state, weather, water level of the body of water, or the like. Moreover, the marine monitoring device 22 may associate the user input with the time and location data, such as by time range or time or location stamp, creating a cross reference, or storing it in a common memory location.

Accordingly, the marine monitoring device 22 associated with the marine vessel 20 may be configured to monitor and gather the trip data and relate that trip data to a specific location and time. Moreover, the marine monitoring device 22 may be configured to gather data from external sources such as by manual user input. This data generated and/or captured by the marine monitoring device 22 of the marine vessel 20 may be transferred to the apparatus 44.

Alternatively or additionally, the marine monitoring device 22 of the marine vessel 20 may receive the sonar data, radar data, chart data, environmental data, or watercraft data from a navigation related system or peripheral devices disposed onboard the marine vessel 20. The peripheral devices may include a sonar system, a Global Positioning System (GPS) device, a radar system, a navigational system, lighting systems, audio and video entertainment devices, weather and environmental sensors, or any other electronic system disposed on the marine vessel 20. Moreover, the marine monitoring device 22 may capture data from the engine, battery, propulsion system, diagnostic systems, and/or the like located on the marine vessel.

The trip data (e.g., the sonar data, the chart data, the radar data, the watercraft data, and the environmental data) described above may be locally stored in a memory associated with the marine monitoring system until the end of the trip or, in some cases, be continually transmitted to the apparatus 44 or a remote storage location. Regardless of when the trip data is sent or received by the apparatus 44, the apparatus 44 may be configured to only generate a trip replay experience of the trip upon receiving trip data indicating the end of the trip.

The trip data captured by the marine monitoring device 22 may be transferred or communicated via wired or wireless communication to the apparatus 44 either directly or via a network 30. The network 30 may be a data network, such as a local area network (LAN), a metropolitan area network (MAN), a wide area network (WAN) (e.g., the Internet), or the like, which may couple the marine vessel 20 and the client device 50 to devices such as processing elements (e.g., personal computers, server computers, or the like) or databases. Communication between the network 30, the client devices 50, the marine vessels 20, and the devices or databases (e.g., servers) to which the marine vessels 20 and the client devices 50 are coupled may be accomplished by either wired or wireless communication mechanisms and corresponding communication protocols.

As such, the marine monitoring device 22 may be a computing device that includes a marine electronic device, a smart phone, a tablet computer, a personal digital assistant (PDA), a laptop computer, a desk top computer, computing terminal, or the like such that the marine monitoring device 22 is capable of communication with a network 30.

Accordingly, for example, the marine monitoring system may include (or otherwise have access to) memory for storing instructions or applications for the performance of various functions and a corresponding processor for executing stored instructions or applications. As described above, the marine monitoring device 22 may include software or corresponding hardware for enabling the performance of the respective functions in accordance with an example embodiment. In this regard, for example, the marine monitoring device 22 may include software for enabling a respective one of the marine vessels 20 to communicate with the network 30 for requesting, receiving, or sending information, data, or services via the network 30. Moreover, in some embodiments, the information or services that are requested via the network may be provided in a software as a service (SAS) environment. The information or services receivable at the marine monitoring system may include deliverable components (e.g., downloadable software to configure the marine monitoring device 22, or information for consumption/processing at the marine vessel 20).

As shown in FIG. 1, the system 10 also includes the apparatus 44. The apparatus 44 may be also be a computing device that includes a smart phone, a tablet computer, a personal digital assistant (PDA), a laptop computer, a desk top computer, computing terminal, network access terminal, or the like such that the apparatus 44 is capable of communication with a network 30. The apparatus is described in greater detail in relation to FIG. 2 below.

As shown in FIG. 1, the system may also include at least one client device 50. The client device 50, similar to the marine monitoring device 22, may also include a computing device (e.g., a computer, a network access terminal, or the like) capable of communication with a network 30. Accordingly, the client device may connect or couple the client or user to the network 30.

As such, for example, the client device 50 may include (or otherwise have access to) memory for storing instructions or applications for the performance of various functions and a corresponding processor for executing stored instructions or applications. As described above, the client device 50 may include software or corresponding hardware for enabling the performance of the respective functions in accordance with an example embodiment. In this regard, for example, the client device 50 may include software for enabling a respective user or client to communicate with the network 30 for requesting, receiving, or sending information, data, or services via the network 30. Moreover, in some embodiments, the information or services that are requested via the network may be provided in a software as a service (SAS) environment. The information or services receivable at the client device 50 may include deliverable components (e.g., downloadable software to configure the client device 50, or information for consumption/processing at the client device 50). As such, for example, the client device 50 may include corresponding executable instructions for configuring the client device 50 to provide corresponding functionalities for communication with the apparatus 44.

In an example embodiment, devices to which the marine vessels 20 and the client devices 50 may be coupled via the network 30 may include one or more application servers (e.g., application server 40), or a database server 42, which together may form respective elements of a server network 32. Although the application server 40 and the database server 42 are each referred to as "servers," this does not necessarily imply that the application server 40 and the database server 42 are on separate servers or devices. As such, for example, a single server or device may include both the application server 40 and the database server 42, and the database server 42 could merely be represented by a database or group of databases physically located on the same server or device as the application server 40. The application server 40 and the database server 42 may each include hardware or software for configuring the application server 40 and the database server 42, respectively, to perform various functions. As such, for example, the application server 40 may include processing logic and memory enabling the application server 40 to access or execute stored computer readable instructions for performing various functions. In an example embodiment, one function that may be provided by the application server 40 may be the provision of access to information or services related to operation of the client devices 50. For example, the application server 40 may be configured to provide for storage of information descriptive of motion or location. In some cases, these contents may be stored in the database server 42. Alternatively or additionally, the application server 40 may be configured to provide analytical tools for use by the client devices 50 in accordance with example embodiments.

In some embodiments, for example, the application server 40 may therefore include an instance of the apparatus 44 comprising stored instructions for handling activities associated with example embodiments described herein. As such, in some embodiments, the client devices 50 may access the apparatus 44 online and utilize the services provided thereby. However, it should be appreciated that in other embodiments, the apparatus 44 may be initiated from an integrated memory of the client 20. In some example embodiments, the apparatus 44 may be provided from the application server 40 (e.g., via download over the network 30) to one or more of the client devices 50 to enable recipient clients to instantiate an instance of the apparatus 44. As yet another example, the apparatus 44 may be instantiated at one or more of the client devices 50 responsive to downloading instructions from a removable or transferable memory device carrying instructions for instantiating the apparatus 44 at the corresponding one or more of the client devices 50. In such an example, the network 30 may, for example, be a peer-to-peer (P2P) network where one of the client devices 50 includes an instance of the apparatus 44 to enable the corresponding one of the client devices 50 to act as a server to other client devices 50. In a further example embodiment, the apparatus 44 may be distributed amongst one or more client devices 50 or the application server 40.

In an example embodiment, the application server 40 may include or have access to memory (e.g., internal memory or the database server 42) for storing instructions or applications for the performance of various functions and a corresponding processor for executing stored instructions or applications. For example, the memory may store an instance of apparatus 44 configured to operate in accordance with example embodiments described herein. In this regard, for example, the apparatus 44 may include software for enabling the application server 40 to communicate with the network 30 or the client devices 50 for the provision or receipt of information associated with performing activities as described herein. Moreover, in some embodiments, the application server 40 may include or otherwise be in communication with an access terminal (e.g., a computer including a user interface) via which analysts may interact with, configure, or otherwise use to maintain the system 10.

FIG. 2 illustrates a block diagram of the apparatus 44 in accordance with an example embodiment. The apparatus 44 may be employed, for example, on any of the client devices 50 of FIG. 1 or a variety of other devices (such as, for example, a network device, server, proxy, or the like (e.g., the application server 40 of FIG. 1)). Additionally or alternatively, embodiments may be employed on a combination of devices. Accordingly, some example embodiments may be embodied wholly at a single device (e.g., the application server 40 or one or more client devices 50) or by devices in a client/server relationship (e.g., the application server 40 and one or more client devices 50).

The apparatus 44 may be configured to receive the trip data generated from the marine monitoring device 22 during the trip conducted by the marine vessel 20. Upon receiving the trip data that indicates the end of the trip of the marine vessel 20 or upon receiving a user request, the apparatus 44 may be configured to generate a trip replay experience based on the trip data received from the marine monitoring device 22. The generated trip replay experience may be a time-based illustration of the trip data as the trip data is gathered from the beginning of the trip until the end of the trip. In some embodiments, the trip replay experience may be generated in a representative first person view such that at least a portion of the trip data is intermingled on a single screen so as to provide the user with a re-creation experience of the trip of the marine vessel 20.

Accordingly, the apparatus 44 may receive a request from a client device 50 to generate a recreation of the trip of the marine vessel 20. The apparatus 44 may retrieve at least a portion of the trip data from a local memory or remote memory or databases. The apparatus 44 may also retrieve trip data from external sources such as third party databases that includes additional information (e.g., historic weather conditions). The external sources may be a website or other server.

The apparatus 44 may filter or process the trip data to recreate or reconstruct the trip of the marine vessel 20. The trip recreation may include at least a portion of the trip data received and a location of the marine vessel 20 as a function of time. The apparatus 44 may cause the trip recreation to be displayed on a screen (e.g., display 140) of the apparatus 44 or the client device 50 for the user to view.

The apparatus 44, therefore, may include a number of different modules or components, each of which may comprise any device or means embodied in either hardware, software, or a combination of hardware and software configured to perform one or more corresponding functions described herein.

Accordingly, the apparatus 44 may include processing circuitry 100 (which includes a processor 110 and a memory 120), a user interface 130, a display 140, and a communication interface 150. The processor 110 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to generate a trip replay experience based on the trip data received. For example, the processor 110 may be configured to receive trip and process the trip data to generate a trip replay experience for display to the user (e.g., on display 140).

In some embodiments, the processor 110 may be further configured to implement signal processing or enhancement features to improve the display characteristics or data or images, collect or process additional data, such as time, temperature, GPS information, waypoint designations, or others, or may filter extraneous data to better analyze the collected trip data. It may further implement notices and alarms, such as those determined or adjusted by a user.

The memory 120 may be configured to store instructions, computer program code, marine data, such as the trip data in a non-transitory computer readable medium for use, such as by the processor 110.

The communication interface 150 may be configured to enable connection to external systems (e.g., the network 30). In this manner, the apparatus 44 may retrieve stored trip data from a remote, external server via the network 30 in addition to or as an alternative to the onboard memory 120.

The user interface 130 may include, for example, a keyboard, keypad, function keys, mouse, scrolling device, input/output ports, touch screen, or any other mechanism by which a user may interface with the system.

The display 140 may be configured to display images and may include or otherwise be in communication with a user interface 130 configured to receive an input from a user. The display 140 may be, for example, a conventional LCD (liquid crystal display), a touch screen display, mobile device, or any other suitable display known in the art upon which images may be displayed.

In any of the embodiments, the display 140 may present one or more sets of trip data (or images generated from the one or more sets of trip data) as a graphical user interface. In some embodiments, the display 140 may be configured to present such trip data simultaneously as one or more layers. In some embodiments, a user may select any of the possible combinations of the trip data for display. In some further embodiments, various portions of the trip data, referred to above, may be superimposed or overlaid onto one another.

Although the display 140 of FIG. 2 is shown as being directly connected to the processor 110 and within the apparatus 44, the display 140 could alternatively be remote from the processor 110 and/or the apparatus 44. In particular, the display 140 may be located on one of the client devices 50.

Trip Replay Experience Examples

FIGS. 3-9 illustrate example embodiments of the images that may be imposed on the display 140 and that are generated based on the trip data received by the apparatus 44. These images may form a representative first person view of trip replay experience based on the trip data received. It should be understood that the images or information imposed as the graphical user interface on the display 140 could vary depending on the parameters selected by the user.

FIG. 3 shows an example graphical user interface that shows available marine vessels and their various locations. In this regard, a user or owner may have access to a plurality of different marine vessels (e.g., a "fleet"). FIG. 3 illustrates a view that enables tracking of the marine vessels and corresponding selection for interaction (e.g., viewing available trip replay experiences.

As shown in FIG. 3, the graphical user interface may have a first region 210 and a second region 220. The first region 210 of the graphical user interface may be a list region that displays a plurality of parameters for user selection. The plurality of parameters may include representative locations of marine vessels 20 that the user or client has permission to view. The first region 210 lists the locations of the marine vessels as a list selectable by the user. For example, the list region lists the plurality of locations in which the marine vessels 20 are located and the corresponding number of marine vessels 20 located at each location. For example, the first region 210 or list region indicates that eight marine vessels are located in the Bahamas, two marine vessels are located in the Cayman Islands, one marine vessel is located in Puerto Rico, five marine vessels are located in Jamaica, and fourteen vessels are located in Miami. The locations of the marine vessels 20 are each configured for user selection. Moreover, the apparatus 44 may generate the locations of the marine vessels 20 by analyzing the trip data received via the marine monitoring device 20 or manual user input via the apparatus 44 or the client device 50.

The second region 220 of the graphical user interface of FIG. 3 is a map region that displays a map graphic. The map graphic, as shown in FIG. 3, displays the locations of each of the marine vessels 20 (or group of marine vessels 20) plotted on the map graphic at their corresponding location. For example, there are pins located at each of the Bahamas, Cayman Islands, Puerto Rico, Jamaica, and Miami to indicate the locations if the marine vessels 20. These pins are configured for user selection. As shown in FIG. 3, the list region and the map region are two separate regions of the graphical user interface. For example, the list region is located on a first portion of the graphical user interface, and the map region is located on a second portion of the graphical user interface, where the first portion and the second portion of the graphical user interface are different.

FIG. 4 shows an example graphical user interface that shows available marine vessels at a specific location (e.g., the Bahamas) as selected by the user. In this regard, a user or owner may have access to a plurality of different marine vessels at a specific location that is selected by the user. FIG. 4 illustrates a view that enables tracking of the marine vessels and corresponding selection for interaction (e.g., viewing available trip replay experiences). As shown in FIG. 4, the graphical user interface may have a first region 310 and a second region 320. The first region 310 or the list region displays a plurality of parameters for user selection. The parameters selectable by the user include a list of the marine vessels located at the previously selected location, which in this example is the Bahamas. Moreover, the second region 320 or the map region shows the specific location of each of the vessels located in the Bahamas as pins plotted on the map graphic. The pins plotted on the map graphic are selectable by the user. As described above in relation to FIG. 3, the apparatus 44 may generate the list region and the map region by analyzing the trip data received from the marine monitoring device 22 or via manual user input from the apparatus 44 or the client device 50.

Even further, as shown in FIG. 4, the map graphic may include a geofence area graphic 330. The geofence area graphic 330 may be defined based on manual user input and overlaid onto the map graphic. In some embodiments, the geofence area graphic 330 designates a boundary in which the marine vessels 20 have permission to operate and/or in which an alarm is triggered if the marine vessel crosses the boundary. Accordingly, if a marine vessel 20 leaves the defined geofence area, the apparatus 44 may be configured to an initiate an alert or alarm, such as to the owner (e.g., text, pop-up message, email, etc.). Moreover, if a marine vessel 20 leaves the defined geofence area, the pin designating the location of the marine vessel 20 on the map graphic may turn a different color (e.g., red) than the pins designating the location of the marine vessel 20 within the geofence area, which in this example are green.

FIG. 5 shows an example graphical user interface that shows information and options related to a specific marine vessel as selected the user. In this regard, a user or owner may have access to a plurality of information regarding a specific marine vessel. FIG. 5 illustrates a view that enables tracking of the specific marine vessel and corresponding selection for interaction (e.g., viewing available trip replay experiences). As shown in FIG. 5, the graphical user interface includes multiple regions including a list region 410, a map region 420, a trip replay region 430, and a vessel status region 440. The list region 410 displays a plurality of parameters for user selection. The parameters selectable by the user include a list of options including a vessel dashboard option 412, a trip replay option 414, a media gallery option 416, a document option 418, or a settings option 419. As shown in FIG. 5, the option selected is the vessel dashboard option. According to some example embodiments, the default option after selecting a particular marine vessel from the plurality parameters is the selection of the vessel dashboard option 412.

As noted above, the default selection of the vessel dashboard option 412 by the apparatus 44 configures the graphical user interface to display the list region 410, the map region 420, the trip replay region 430, and the vessel status region 440. Each of the list region 410, the map region 420, the trip replay region 430, and the vessel status region 440 may be located in different portions of the graphical user interface. For example, the list 410 region may be located on a first portion, the map region 420 may be located on a second portion, the trip replay region 430 may be located on a third portion, and the vessel status region 440 may be located on a fourth portion, where the first, second, third, and fourth portions are different.

The map region 420 shows at least one trip 422 of the marine vessel 20 plotted on the map graphic. In some cases, the apparatus 44 may be configured to cause display of a portion the last trip data received from the marine monitoring device of the selected marine vessel. Accordingly, the course of the last trip may be displayed on the map graphic. Alternatively or additionally, the apparatus 44 may be configured to cause display of each of the trips taken by the selected marine vessel 20 based on the trip data received from the marine monitoring device 22 of the selected marine vessel 20. Accordingly, the user may then select any plotted trip on the map graphic to cause the generation of or access to the trip replay experience for the plotted course selected.

The vessel status region 440 may display a portion of the trip data last received from the selected marine vessel 20. The vessel status region 440, for example, may indicate the current location 442 of the marine vessel 20, the current total engine hours 448 of the marine vessel 20, and the date/time 444 when the apparatus was in communication with the marine monitoring device 22 of the marine vessel 20. In some cases, the vessel status region 440 may also indicate the type of marine vessel 446, such as the make/model. Moreover, the vessel status region 440 may include a security system option 449. Accordingly, the user may be able to turn on or off the security system of the marine vessel 20.

The trip replay section 430 may be divided up into a first portion 432 and a second portion 434. The first portion 432 may be a date selection portion in which the user may input dates in order to cause the generation of a trip replay experience. The second portion 434 may be a recent trip replay portion. The recent trip replay portion may display recent generations of a trip replay experience associated with the marine vessel 20. The recent generations of trip replay experiences may be associated with a corresponding photo and date in order for ease of selection by the user. In some embodiments, instead of (or in addition to) inputting available dates, a user may simply select a recent trip replay option from the recent trip replay portion for accessing the corresponding trip replay experience.

FIG. 6 shows an example graphical user interface that shows trip replay options available to the user in relation to a specific marine vessel. FIG. 6 illustrates a view that enables viewing available trip replay experiences. As shown in FIG. 6, the graphical user interface includes a first region 510, a second region 520, and third region 530. The first region 510 includes a selectable parameter that enables the user return to the default screen associated with Vessel 2. In some cases, the first region 510 or list region may be on a different portion of the graphical user interface from the second region 520. In other cases, as shown in FIG. 6, the first region 510 may be imposed over or on top of the second region 520.

Moreover, the second region 520 or map region displays a map graphic which has a third region 530 or trip replay region imposed over or on top of the map graphic. The trip replay region or third region 530 may have a first portion 532 and a second portion 534. The first portion 532 may be a date selection portion in which the user may input dates in order to cause the generation of a trip replay experience. The second portion 534 may be a recent trip replay portion. The recent trip replay portion may display recent generations of a trip replay experience associated with the marine vessel. In some embodiments, instead of (or in addition to) inputting available dates, a user may simply select a recent trip replay option from the recent trip replay portion for accessing the corresponding trip replay experience.

FIG. 7 shows an example graphical user interface that shows available media for viewing by the user in relation to a specific marine vessel. FIG. 7 illustrates a view that enables viewing available media such as pictures, videos, music and/or the like. As shown in FIG. 7, the graphical user interface includes a first region 610 and a second region 620. The first region displays a plurality of parameters for user selection. The parameters selectable by the user include the list of options including the vessel dashboard option 612, the trip replay option 614, the media gallery option 616, the document option 618, or the settings option 619. The second region illustrates picture or video data received by the apparatus 44 from either the client device 50 or the marine monitoring device 22 of the marine vessel 20. The apparatus 44 may be configured to arrange the picture or video data into groups by date. Accordingly, the apparatus 44 may generate the second region by analyzing the trip data for any picture or video data received from the marine monitoring device 22 or from manual user input via the apparatus 44 or the client device 50.

The user may also select the documents option 418 or setting option 419 from the list region 410 illustrated in FIG. 5. By selecting the documents option 418, the user may upload documents to the apparatus 44. The documents may be related to the selected marine vessel such as maintenance documents, rental documents, or the like. Moreover by selecting the setting option, the owner of the marine vessel 20 may be able to give permission to allow others access to the trip data associated with the marine vessel 20. In some cases, persons who have requested access to the trip data of the marine vessel 20 may be shown under the settings option 419, and therefore, the owner of the marine vessel 20 may be able to give the person that requested permission access to the trip data. Once a person has permission to access the trip data, then he or she may also be able to upload data from his or her associated client device 50.

FIGS. 8 and 9 show an example graphical user interface that shows a representative first person view of a selected trip replay experience in relation to a specific marine vessel. FIGS. 8 and 9 illustrate a view that enables viewing a selected trip replay experience. As shown in FIG. 8, the graphical user interface includes a list region 710, a map region 720, a gauge region 730, and a timeline region 740. As shown in FIG. 8, a representative first person view of the trip of the marine vessel is recreated based on the trip data associated with the date range selected by the user.

The timeline region 740 represents a time-based illustration of the trip from the beginning to the end of the trip. From the timeline region, the user may be able to pause the trip replay experience or select the speed in which the trip replay experience is played. Moreover, the map region 720 may include a map graphic and the course of the trip may be plotted on the map graphic. Accordingly, based on the trip data received by the apparatus 44, the apparatus 44 may be configured to determine the course of the trip as a function of time. Thus, as the trip moves from the beginning to the end to the end of the trip, a pin moves along the plotted course of the trip to represent the corresponding location of the marine vessel along path or course at the corresponding time during the trip.

Even further, as the trip moves from the beginning to the end of the trip, the gauge region 730 is configured to display a representation or recreation of the gauge of the marine vessel 20. Accordingly, the apparatus 44 may be configured to, based on the trip data received, determine at least the fuel level, the water depth, the oil pressure, the coolant temperature, the speed of the marine vessel 44, and engine data as a function of the time and location of the marine vessel 20 in order to recreate the actual readings of the gauges of the marine vessel 20.

As shown in FIG. 8, the timeline region 740 and the map region 720 may be located on a first portion and second portion of the graphical user interface, respectively, where the first and second portions are different. Moreover, the list region 710 and the gauge region 730 may be, at least in part, imposed on or on top of the map region 720. For example, the gauge region 730 may be located on a lower portion of the map region 720 of the graphical user interface in order to represent a dashboard of the marine vessel 20. Accordingly, the plurality of types of trip data are presented intermingled on a single screen so as to provide the user with a re-creation experience of the trip of the marine vessel 20.

As shown in FIG. 9, the graphical user interface may even further include a scrolling media section 750 that illustrates picture or video received as a function of the time and location of the marine vessel 20. Accordingly, as the trip moves from the beginning to the end, the apparatus 44 may be configured to display the picture or video data of the trip data only at the corresponding time in which the picture or video data was taken during the trip. Moreover, this scrolling media section 750 may be imposed on or on top of the map region 720. In some cases, the scrolling media section 750 may be imposed on or on tip of the map region 720 such that scrolling media section is located directly below the list region 710. In some cases, the scrolling media section may illustrate data indicative of alerts associated with the marine vessel 20. Accordingly, as the trip moves from the beginning to the end, the apparatus 44 may be configured to display the alert only at the corresponding time in which data indicative of the alert was received during the trip. As shown in FIG. 9, the apparatus may be configured to generate one or more photograph icons 742 or alert icons 744 on the timeline region 740. The photograph icons 742 and alert icons 744 may indicate the time that the picture/video was taken during the trip or indicate when the alert was issued. Accordingly, the user may simply look at the timeline region 740 to have a snapshot view of when the picture/video or alert data was generated during the trip.

Moreover, the apparatus 44 may be configured to, when generating the trip replay experience as shown in FIGS. 8 and 9, apply canned music and/or background effects stored by the apparatus 44 to the trip replay experience in order to enrich the playback experience. Even further, the apparatus 44 may be configured to, upon user selection, transfer, in video form, the generated trip replay experience to user-selected social media sites. In some cases, the apparatus, via user selection, may be configured to transfer only a selected part of the generated trip replay experience to user-selected social media sites. For example, the picture or video data used in the generation of the trip replay experience may only be sent to user-selected social media sites.

According to some example embodiments, upon receiving trip data that indicates the end of the trip, the apparatus 44 may automatically generate the trip replay experience and then post the generated trip replay experience to user-selected social media sites. Alternatively or additionally, the apparatus 44 may send the generated trip replay experience directly to the client device 50 for viewing.

Example Flowchart

Embodiments of the present invention provide methods, apparatus and computer program products for generating a trip replay experience. Various examples of the operations performed in accordance with embodiments of the present invention will now be provided with reference to FIG. 10.

FIG. 10 illustrates a flowchart according to an example method for generating a trip replay experience according to an example embodiment. The operations illustrated in and described with respect to FIG. 10 may, for example, be performed by, with the assistance of, and/or under the control of one or more of the processor 10, memory 120, communication interface 150, user interface 120, or the display 140. The method may include receiving marine trip data at operation 800. The marine trip data may be generated from a plurality of sensors or systems associated with (e.g., located onboard) a marine vessel during a trip conducted by the marine vessel, where the trip defines a beginning and an end. The method may also include generating a trip replay experience based on the marine trip data received from the plurality of sensors or systems during the trip conducted by the marine vessel at operation 810. The trip replay experience may include a time-based illustration that shows a representation of the trip data as the trip data is gathered from the beginning of the trip to the end of the trip, where the trip replay experience shows a plurality of types of trip data including at least a location of the marine vessel as a function of time during the trip and one or more other types of trip data as a function of time during the trip. Moreover, the trip replay experience may be formed into a representative first person view such that the plurality of types of trip data are presented intermingled on a single screen so as to provide the user with a re-creation experience of the trip The method may further include causing display of the trip replay experience of the trip of the marine vessel on a screen at operation 820.

It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120 and executed by, for example, the processor 110. As will be appreciated, any such computer program product may be loaded onto a computer or other programmable apparatus (for example, the apparatus 44) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, the apparatus 44) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. An apparatus comprising a processor and memory including computer program code, wherein the computer program code is configured to, with the processor, cause the apparatus to:
   receive trip data, wherein the trip data is generated from a plurality of sensors or systems associated with a marine vessel during a trip conducted by the marine vessel, wherein the trip defines a beginning and an end;
   generate a trip replay experience based on the trip data received from the plurality of sensors or systems during the trip conducted by the marine vessel, wherein the trip replay experience includes a time-based illustration that shows a representation of the trip data as the trip data is gathered from the beginning of the trip to the end of the trip, wherein the trip replay experience shows a plurality of types of trip data including at least a location of the marine vessel as a function of time during the trip and one or more other types of trip data as a function of time during the trip, wherein the trip replay experience is formed into a representative first person view such that the plurality of types of trip data are presented intermingled on a single screen so as to provide the user with a re-creation experience of the trip, wherein the trip replay experience is formed into a graphical user interface that includes a plurality of parameters for user selection, wherein the graphical user interface forms the representative first person view by including:
   at least one map region including a map showing the location of the marine vessel during the trip, wherein the map region is displayed on a first portion of the graphical user interface, and
   at least one gauge region including at least one gauge graphic that displays at least one of engine data, battery data, or propulsion system data, wherein the at least one gauge region is displayed on a second portion of the graphical user interface at least partially imposed on the first portion; and
cause display of the trip replay experience of the trip of the marine vessel on a screen.

2. The apparatus of claim 1, wherein the beginning of the trip is defined as receiving trip data that indicates ignition of an engine of the marine vessel is detected, and wherein the end of the trip is defined as receiving trip data that indicates deignition of the engine of the marine vessel is detected.

3. The apparatus of claim 2, wherein the computer program code is further configured to, with the processor, cause the apparatus to automatically generate the trip replay experience upon receipt of the trip data that indicates deignition of the engine of the marine vessel.

4. The apparatus of claim 1, wherein the beginning of the trip is defined as receiving trip data that indicates motion of the marine vessel for a first predetermined amount of time is detected, and wherein the end of the trip is defined as receiving trip data that indicates no motion of the marine vessel for a second predetermined amount of time is detected.

5. The apparatus of claim 1, wherein the trip data generated from a plurality of sensors or systems associated with the marine vessel is comprised of at least one of sonar data, user mobile device data, radar data, chart data, environmental data, or watercraft data.

6. The apparatus of claim 5, wherein the sonar data is received from a sonar system in communication with a marine electronic device associated with the marine vessel, wherein the sonar system is configured to gather sonar data from the underwater environment around the marine vessel.

7. The apparatus of claim 5, wherein the user mobile device data is comprised of at least one of picture data, video data, music data, or wearable device data.

8. The apparatus of claim 5, wherein the watercraft data is comprised of at least one of engine data, battery data, propulsion system data, navigational instructions data, alert data, or diagnostic system data.

9. The apparatus of claim 1, wherein the trip data is further generated from a source external to the marine vessel, and wherein the computer program code, is further configured to, with the processor, cause the apparatus to generate the trip replay experience based at least on the trip data received from the plurality of sensors or systems associated with the marine vessel and the source external to the marine vessel during the trip conducted by the marine vessel.

10. The apparatus of claim 9, wherein the trip data received from the source external to the marine vessel is comprised of weather data.

11. The apparatus of claim 1, wherein the graphical user interface further comprises at least one picture region configured to display picture data comprised of one or more pictures received by the apparatus, and wherein the picture region is located on a third portion of the graphical user interface, and wherein the third portion is at least partially imposed on the first portion.

12. The apparatus of claim 1, wherein the graphical user interface further comprises at least one scrolling timeline region configured to display a timeline of the trip from the beginning to the end, and wherein the scrolling timeline region is located on a fourth portion of the graphical user interface, and wherein the fourth portion and the second portion are different.

13. A computer program product comprising a non-transitory computer readable medium including computer program code configured to, with a processor, cause an apparatus to:
   receive trip data, wherein the trip data is generated from a plurality of sensors or systems associated with a marine vessel during a trip conducted by the marine vessel, wherein the trip defines a beginning and an end;
   generate a trip replay experience based on the trip data received from the plurality of sensors or systems during the trip conducted by the marine vessel, wherein the trip replay experience includes a time-based illustration that shows a representation of the trip data as the trip data is gathered from the beginning of the trip to the end of the trip, wherein the trip replay experience shows a plurality of types of trip data including at least a location of the marine vessel as a function of time during the trip and one or more other types of trip data as a function of time during the trip, wherein the trip replay experience is formed into a representative first person view such that the plurality of types of trip data are presented intermingled on a single screen so as to provide the user with a re-creation experience of the trip, wherein the trip replay experience is formed into a graphical user interface that includes a plurality of parameters for user selection, wherein the graphical user interface forms the representative first person view by including:
      at least one map region including a map showing the location of the marine vessel during the trip, wherein the map region is displayed on a first portion of the graphical user interface, and
      at least one gauge region including at least one gauge graphic that displays at least one of engine data, battery data, or propulsion system data, wherein the at least one gauge region is displayed on a second portion of the graphical user interface at least partially imposed on the first portion; and
   cause display of the trip replay experience of the trip of the marine vessel on a screen.

14. The computer program product of claim 13, the beginning of the trip is defined as receiving trip data that indicates ignition of an engine of the marine vessel is detected, and wherein the end of the trip is defined as receiving trip data that indicates deignition of the engine of the marine vessel is detected.

15. The computer program product of claim 14, wherein the computer program code is further configured to, with the processor, cause the apparatus to automatically generate the trip replay experience upon receipt of the trip data that indicates deignition of the engine of the marine vessel.

16. The computer program product of claim 13, wherein the beginning of the trip is defined as receiving trip data that indicates motion of the marine vessel for a first predetermined amount of time is detected, and wherein the end of the trip is defined as receiving trip data that indicates no motion of the marine vessel for a second predetermined amount of time is detected.

17. The computer program product of claim 13, wherein the trip data generated from a plurality of sensors or systems associated with the marine vessel is comprised of at least one of sonar data, user mobile device data, radar data, chart data, environmental data, or watercraft data.

18. The computer program product of claim 13, wherein the graphical user interface further comprises at least one picture region configured to display picture data comprised of one or more pictures received by the apparatus, and wherein the picture region is located on a third portion of the graphical user interface, and wherein the third portion is at least partially imposed on the first portion.

19. The computer program product of claim 13, wherein the graphical user interface further comprises at least one scrolling timeline region configured to display a timeline of the trip from the beginning to the end, and wherein the scrolling timeline region is located on a fourth portion of the graphical user interface, and wherein the fourth portion and the second portion are different.

20. A method comprising:
receiving trip data, wherein the trip data is generated from a plurality of sensors or systems associated with a marine vessel during a trip conducted by the marine vessel, wherein the trip defines a beginning and an end;
generating a trip replay experience based on the trip data received from the plurality of sensors or systems during the trip conducted by the marine vessel, wherein the trip replay experience includes a time-based illustration that shows a representation of the trip data as the trip data is gathered from the beginning of the trip to the end of the trip, wherein the trip replay experience shows a plurality of types of trip data including at least a location of the marine vessel as a function of time during the trip and one or more other types of trip data as a function of time during the trip, wherein the trip replay experience is fonned into a representative first person view such that the plurality of types of trip data are presented inteimingled on a single screen so as to provide the user with a re-creation experience of the trip, wherein the trip replay experience is formed into a graphical user interface that includes a plurality of parameters for user selection, wherein the graphical user interface forms the representative first person view by including:
at least one map region including a map showing the location of the marine vessel during the trip, wherein the map region is displayed on a first portion of the graphical user interface, and
at least one gauge region including at least one gauge graphic that displays at least one of engine data, battery data, or propulsion system data, wherein the at least one gauge region is displayed on a second portion of the graphical user interface at least partially imposed on the first portion; and
causing display of the trip replay experience of the trip of the marine vessel on a screen.

\* \* \* \* \*